3,682,767
ETHYLENE COPOLYMER BLEND FOR LIQUID
PACKAGING FILM
Arthur Wray Britton, Wilmington, Del., George Wilson
Luckey, Richmond, Va., Glenn William Mansell,
Orange, Tex., and John Douglas Snyder, Richmond,
Va., assignors to E. I. du Pont de Nemours and Company, Wilmington, Del.
No Drawing. Filed Oct. 2, 1970, Ser. No. 77,689
Int. Cl. B32b 27/34; C08f 37/18; C08j 1/40
U.S. Cl. 161—227
9 Claims

ABSTRACT OF THE DISCLOSURE

A plastic film having an improved melt strength that assists in effecting reliable heat seals, particularly when the film is used in a make-and-fill process for packaging liquids, such as milk. The film is prepared from a blend of (a) 90–50 weight percent of a random copolymer of ethylene and an olefinic unsaturated monomer wherein the olefinic unsaturated monomer is present in the amount of about 2–10 weight percent of the copolymer and the copolymer has a melt index of about .2 to 1.0 and a melting point of 95–110° C., and (b) 10–50 weight percent of a linear copolymer of ethylene and an olefinic unsaturated monomer said linear copolymer having a density of about .93 to .96 and a melt index of about .3 to 2.5. Optionally, this film can be coated with a vinylidene chloride copolymer composition or laminated to other films forming a composite film structure.

BACKGROUND OF THE INVENTION

This invention relates to an ethylene copolymer blend used to prepare film for make-and-fill packaging of liquids. Optionally, this film can be coated or laminated to other films forming a composite film structure.

It is known that foods such as rice, beans and corn can be packaged for consumer use in an apparatus sometimes referred to as a make-and-fill apparatus. The phrase "make-and-fill" is used to denote the fact that the package is formed and filled in one operation on one machine. One type of packaging material frequently used in make-and-fill machines is plastic film.

The plastic film useful in a make-and-fill process should have at least the following characteristics. The plastic film must be useable in the packaging apparatus and must be strong enough to contain the product in its end use. In order for the package to meet end-use requirements, such as containing the packaged food and withstanding customer handling, it should have a high average molecular weight that can be expressed by its melt index which should be within the range of about 0.2 to 1.0 and have a secant modulus equal to or less than 32K p.s.i. However, in order for the film to have the proper stiffness to track properly, the film secant modulus should be equal to or greater than 16K p.s.i. This defines the useful range of the secant modulus as about 16–32K p.s.i. In addition, the film must be able to slip through the packaging apparatus and, therefore, should have a coefficient of friction of about 0.1 to 0.3. The coefficient of friction can be adjusted by adding any one of a number of commercially available slip additives.

One make-and-fill device incorporating such plastic film as the packaging material and useful to this invention is the Prepac Model 1S–2, manufactured by Societe Prepac, 62 Rue Pasteur, Villejuif 94, France. The make-and-fill process proceeds by feeding the plastic film in a vertically downward direction wherein the vertical sides of the film are made to overlap each other and are heat-sealed, forming a hollow tube. The bottom of the tube first passes through clamping jaws containing a hot wire wherein the hot wire is pressed against the hollow plastic film, sealing the bottom of the hollow tube to form the bottom of the package. The temperature of the hot wire must be great enough to cut the plastic film and melt the plastic to form a heat seal. The hot wire simultaneously creates a temperature gradient in the plastic film adjacent the seal, with the temperature decreasing with increased distance from the seal.

The hollow plastic tube is formed around a nozzle which exudes the food material to be packaged into the plastic bag having one end, the bottom, sealed. After the appropriate amount of food material has been fed into the bottom of the hollow tube, the food-filled tube advances so that the top of the tube is now in a position to be heat-sealed and cut by the clamping jaws. This results in a food-filled plastic bag suitable for consumer distribution.

Each bag is advanced through the heat-sealing and cutting jaws by the force of gravity acting on the contents of the bag in a manner described as "fill-and-drop." As the filled package drops through the clamping jaws, various forces act against the heat seals as they are formed and immediately after they are formed. For example, as the filled bag drops through the clamping jaws, the food in the bag is thrust against the bottom heat seal which is still warm. The forces thereby created and acting on the hot heat seals can cause the seal to rupture catastrophically in extreme cases or cause small voids (pin hole leaks) to form in the seal area. Furthermore, even if the seals remain intact, these forces can cause the hot plastic material in the area of the seal and within the temperature gradient to "neck" creating a weak spot in the plastic bag. In the instance where the food being packaged is liquid, the effect of these forces tends to be much greater at the heat seals than the forces effected against the heat seals when packaging solid foods, such as corn or beans. It is believed that one reason for this is that solid foods which have greater bulk tend to direct and dissipate much of their forces against the walls rather than the bottom seal of the plastic bag as in the case of packaging liquids.

Most of the polyethylenes and other film types commonly used to package solid products by the make-and-fill process do not have sufficient high temperature strength to be used for packaging liquids. Other films, particularly those made from ethylene vinyl acetate copolymers, are frequently used in make-and-fill operations because of their excellent sealing characteristics and good solid state durabilities. However, because such films, even at very high molecular weights, have a relatively low amount of strength at elevated temperatures, durable and nonleaking packages of liquid products can be made only over a very narrow range of machine sealing conditions and the degree of control required is impractical for use in commercial packaging.

Therefore, there is a need for a relatively inexpensive plastic packaging material easy to prepare and useful for packaging liquids wherein the plastic has an improved high temperature strength sufficient to make a good heat seal and contain the food during a make-and-fill operation.

SUMMARY OF THE INVENTION

Accordingly, the present invention provides a film for liquid packaging having a secant modulus of 16-32K p.s.i., a coefficient of friction of .1 to .3, a melt index of .2 to 1.0 and improved high-temperature-strength with excellent heat-sealing characteristics. The film is comprised of a blend of (a) 90-50 weight percent of a random copolymer of ethylene and an olefinic unsaturated monomer wherein the olefinic unsaturated monomer is present in the amount of about 2-10 weight percent of the copolymer and the copolymer has a melt index of about .2 to 1.0 and a melting point of 95-110° C. and (b) 10-50 weight percent of a linear copolymer of ethylene and an olefinic unsaturated monomer said copolymer having a density of .93 to .96 and a melt index of .3 to 2.5. Optionally, the films of this invention can be coated with vinylidene chloride coating compositions.

DETAILS OF THE INVENTION

The blends of the present invention are prepared from the following ingredients:

(a) 90-50 weight percent of a random copolymer of ethylene and an olefinic unsaturated monomer prepared by a high pressure process wherein the olefinic unsaturated monomer is present in the amount of about 2 to 10, preferably 3.5, weight percent of the copolymer and the copolymer has a melt index of about .2 to 1, preferably .5 and a melting point of 95 to 110° C., preferably 105° C., and (b) 10-50 weight percent of a linear copolymer of ethylene and an olefinic unsaturated monomer wherein the copolymer has a density of about .93 to .96, preferably .935-.955, and a melt index of about .3 to 2.5, preferably .4 to 2.0.

The random copolymer is preferably present in the amount of 70-90 weight percent with the olefinic unsaturated monomer in the random copolymer present in the amount of 2-5 weight percent, whereas, the linear copolymer portion of the blend is preferably present in complementing proportions, namely 10 to 30 weight percent. The amount of olefinic unsaturated monomer present in the linear copolymer is determined by adding enough to meet the required density, namely .93 to .96.

The random copolymer can be prepared from copolymers of ethylene such as those produced by free radical copolymerization with monomers of the type of vinyl acetate, methyl methacrylate, ethyl acrylate, styrene, vinyl methyl ether, diisobutylene, methacrylic acid, and acrylonitrile, the important criterion being that the melting point of the copolymer be in the range of 95 to 110° C. and the melt index in the range of 0.2 to 1.0. The preferred random copolymer is ethylene containing 2 to 5 weight percent vinyl acetate having a melt index of .5 and a melting point of 105° C.

Useful linear copolymers include copolymers of ethylene and α-olefins having 3 to 20 carbon atoms such as propylene, butene-1, pentene-1, hexene-1, heptene-1, octene-1, decene-1, 4-methylpentene-1, tetradecene-1, and octadecene-1, as well as mixtures of these monomers, such as heptene-1/octene-1/nonene-1 mixtures, the important criterion being that the density of the linear copolymer should fall in the range of .93 to .96 and a melt index of .3 to 2.5. The preferred linear copolymer is either (a) ethylene copolymerized with butene-1 to yield a 3% by weight comonomer concentration and having a density of about 0.930 to 0.945 and a melt index of 1.9 or (b) ethylene copolymerized with octene-1 to yield a 0.5% comonomer concentration and having a density of about 0.940 to 0.960 and a melt index of 0.45. When the copolymer of ethylene/butene-1 is used, it is preferably present in the amount of 20 to 30 weight percent of the blend and when the copolymer of ethylene/octene-1 is used, it is preferably present in the amount of 10 to 20 weight percent of the blend.

The copolymers can be blended by any conventional technique capable of producing a uniform homogeneous blend and the resulting blend can be extruded into flat or tubular film by any of the conventional extrusion processes heretofore employed in the production of thermoplastic polymeric film.

In a preferred embodiment, as in the following examples, the blends are prepared by dry-blending the copolymers and then melt-blending the copolymers with a slip additive, such as a fatty acid amide (e.g., erucamide) and silica, and thereafter melt-extruding the blends into films by the process disclosed in Dyer et al., U.S.P. 2,966,700.

The plastic films of the present invention optionally can be coated with vinylidene chloride copolymer-type coatings such as those disclosed in U.S. Ser. No. 747,445, filed July 25, 1968 and U.S. Ser. No. 816,811, filed Apr. 16, 1969, both now abandoned. U.S. Ser. No. 747,445 relates to a coating composition comprising a copolymer of vinylidene chloride and at least one other ethylenically unsaturated monomer copolymerizable therewith and a nonionic surfactant. More particularly, the copolymer comprises between about 65 and 95 parts by weight of vinylidene chloride, about 5-35 parts by weight of at least one other ethylenically unsaturated monomer copolymerizable therewith and between about 0.1% and about 1% by weight based upon the total weight of said composition of a nonionic surfactant. The composition can additionally contain about 2-7 weight percent of a wax such as natural waxes, petroleum waxes, or synthetic waxes having a melting point of at least 75° C. and a hardness value of at least 0.25 kg. per square millimeter at 60° C. Preferably, useful ethylenically unsaturated monomers include 3-8 parts by weight of acrylic acid or itaconic acid, about 5-20 parts by weight of ethyl acrylate, or about 5-20 parts by weight of methyl methacrylate and acrylonitrile.

U.S. Ser. No. 816,811 discloses a useful copolymer coating composition and a process for applying the coating. More specifically, the process includes subjecting at least one surface of the film to chlorination and thereafter applying to that chlorinated surface an aqueous dispersion of copylmer comprising about 85-92 weight percent vinylidiene chloride, about 4-6 weight percent of an organic acid selected from methacrylic acid and mixtures of methacrylic and acrylic acids containing up to 50 weight percent of acrylic acid with the remainder of the coated composition being at least one monomer selected from methyl acrylate, methylmethacrylate, ethyl acrylate and ethyl methacrylate. The aqueous dispersion is prepared by continuously bringing the monomers into contact with the reactor in the presence of a polymerization initiator and in the presence of about 0.01 to 0.20 of surfactant based on the weight of the copolymer. Thereafter, about 0.2-0.4 percent of ionic surfactant is incorporated into the dispersion wherein the total surfactant in the dispersion comprises up to about 0.6 weight percent of the copolymer.

The coated or uncoated films of the present invention can be used to prepare laminated structures that are also useful in liquid packaging. The laminates are prepared by conventionally bonding the films of the present invention to films prepared from polyamides, e.g. nylon; polyesters, e.g. polyethylene terephthalate; polyolefins, e.g. polypropylene; cellulose products, e.g. paper, paperboard, and regenerated cellulose.

The following tests are used to characterize the product of the present invention.

Density is determined by conditioning the sample as described in ASTM-D-1248-65T for a sample in the range of .910 to .940 and in ASTM-D-65T for a sample in the range .941 to .965 and then measuring its density as described in ASTM–D–1505–63T.

Melting point is determined with a Du Pont Model 900 Differential Thermal Analyzer available from E. I. du Pont de Nemours and Company, Wilmington, Del. The sample is heated to above 150° C., cooled to room temperature, and then reheated at 15° C./min.

Melt Index (MI) is determined as described in ASTM–D–1238–56T; Condition E.

Secant modulus is determined at 1% strain according to ASTM–D–882–64T.

Kinetic coefficient of friction is determined by ASTM–D–1894–63.

The following examples illustrate the present invention. All parts, percentages and proportions are by weight unless otherwise indicated.

ensure uniform mixing and, subsequently, melt-extruding the blends into three-mil-thick film by the process of Dyer et al., USP 2,966,700. The films are evaluated on a Prepac fill-and-drop machine, Model 1S–2 by making and filling quart-sized packages of water. The operating range of the film is determined by selecting impulse and dwell times to give a machine speed of 30 packages per minute (this represents a typical rate for commercial production) and then establishing the range of wire voltages giving adequate horizontal seals with each film. The results are summarized in Table I. As the table shows, both copolymer blend samples B and C have an operating range of two volts, whereas the comparative sample A, which contains no linear copolymer, has a range of only one volt. A one-volt range is insufficient for reliable packaging performance on this type of machine, whereas a two-volt range is acceptable.

TABLE I.—EFFECT OF COMPOSITION ON MACHINE SEALING RANGE

| Film composition | Conditions for horizontal seal | | | Package quality | | Voltage operating range, volts |
|---|---|---|---|---|---|---|
| | Impulse, sec. | Dwell, sec. | Voltage, volts | Machine leakers [1] | Seal durability [2] | |
| Example: | | | | | | |
| 1 ............ Composition A (E/VA and E/B) | 0.3 | 1.6 | 5.8 | Minimum for cutting | | 2 |
| | 0.3 | 1.6 | 6.6 | 0/120 | Pass | |
| | 0.3 | 1.6 | 7.5 | 0/100 | ...do | |
| | 0.3 | 1.6 | 8.8 | 0/100 | ...do | |
| | 0.3 | 1.6 | 9.8 | Many | Fail | |
| 2 ............ Composition B (E/VA and E/O) | 0.3 | 1.6 | 5.8 | Minimum for cutting | | 2 |
| | 0.3 | 1.6 | 6.0 | 0/100 | Fail | |
| | 0.3 | 1.6 | 6.8 | 5/100 | Pass | |
| | 0.3 | 1.6 | 7.6 | 1/100 | ...do | |
| | 0.3 | 1.6 | 8.6 | 0/200 | ...do | |
| | 0.3 | 1.6 | 9.8 | Many | Fail | |
| Comparative sample .... Composition C (E/VA) | 0.3 | 1.6 | 5.0 | Minimum for cutting | | 1 |
| | 0.3 | 1.6 | 5.8 | [3] 0/120 | Pass | |
| | 0.3 | 1.6 | 6.8 | 0/100 | ...do | |
| | 0.3 | 1.6 | 7.5 | 1/90 | Fail | |

[1] A machine leaker is a package that leaks during the make-and-fill operation.
[2] Seal Durability is measured by the response of the package to severe hand squeezing. No seal failures out of ten packages are required for passing.
[3] Number failed/number tested.

EXAMPLES 1 AND 2

Films are prepared from the following compositions:

Example 1—Composition A

A film, representative of a preferred composition of this invention, having a melt index of 0.65, a secant modulus of 26K p.s.i. prepared from a blend of (a) 76 weight percent of the ethylene/vinyl acetate (E/VA) random copolymer of composition A, and (b) 24 weight percent of an ethylene/butene (E/B) linear copolymer containing about 97 weight percent ethylene and about 3 weight percent butene and having a melt index of 1.9 and a density of .938.

Example 2—Composition B

A film, representative of a preferred composition of this invention, having a melt index of 0.46 and a secant modulus of 26K p.s.i. prepared from a blend of (a) 86 weight percent of ethylene/vinyl acetate (E/VA) random copolymer of composition A, and (b) 14 weight percent of an ethylene/octene (E/O) linear copolymer containing about 99.5 weight percent ethylene and about 0.5 weight percent octene and having a melt index of 0.45 and a density of .950.

Comparative Sample—Composition C

A comparative film sample representative of the prior art prepared from an ethylene/vinyl acetate (E/VA) random copolymer containing 3.5 weight percent vinyl acetate having a melt index of 0.5 and a melting point of 105° C.

The films described above are prepared by dry-blending the component resins with slip additives, melt-blending to

EXAMPLES 3–5

A series of homopolymers, copolymers and blends thereof are made into films according to the procedure disclosed in Examples 1 and 2. The compositions and characteristics of the polymers and films are given in Table II. Examples 3, 4 and 5 are prepared according to the present invention and Samples A to J are prepared outside of the present invention and are submitted for comparative purposes. The films are evaluated on a Prepac machine Model 1S–2 by making and filling quart-sized packages of water. Film performance is judged by machine runability and package durability. The results are given in Table II.

These films are selected to illustrate the critical effect of the claimed parameters. The films of the instant invention, represented by Examples 3, 4 and 5, demonstrate the improvement provided by the present invention by illustrating their acceptability for use. Samples A and B demonstrate the inadequate machine performance resulting from an insufficiency in the amount of linear copolymer component present. Sample C shows the complete inability of the film to track through the machine due to a high melt index, an insufficient amount of linear copolymer, and a marginal secant modulus. Sample D illustrates a film with poor package durability apparently due to the high melt index of the random copolymer. Samples E through J show poor machine performance and/or inadequate package durability resulting from one or more of the following: use of homopolymer instead of copolymer; single polymer instead of blend of polymers; insufficient amount of linear copolymer component present; high melt index; or film too stiff for durability.

TABLE II

| | | Random component | | | Linear component | | | Film properties | | Film functionality | |
|---|---|---|---|---|---|---|---|---|---|---|---|
| | Percent | Percent VA [1] | Melt index | Melting point (° C.) | Percent | Melt index | Density | Melt index | Secant modulus, K p.s.i. | Machine performance [2] | Package durability [3] |
| Ex. No.: | | | | | | | | | | | |
| 3 | 86 | 3.5 | 0.5 | 105 | 14 | 0.45 | 0.950 | 0.5 | 26 | Good | Pass. |
| 4 | 75 | 3.5 | 0.5 | 105 | 25 | 0.45 | 0.950 | 0.5 | 32 | do | Do. |
| 5 | 75 | 3.5 | 0.5 | 105 | 25 | 1.9 | 0.938 | 0.65 | 26 | do | Do. |
| Sample: | | | | | | | | | | | |
| A | 100 | 3.5 | 0.5 | 105 | | | | 0.5 | 17-19 | Fair | Do. |
| B | 95 | 3.5 | 0.5 | 105 | 5 | 17 | 0.963 | 0.5 | 18-20 | do | Do. |
| C | 95 | 7.5 | 1.2 | 98 | 5 | 17 | 0.963 | 1.2 | 15-16 | ([4]) | |
| D | 75 | 7.5 | 1.2 | 98 | 25 | 0.45 | 0.950 | 1.0 | 29 | Good | Fail. |
| E | 100 | [5] 0 | 1.8 | 107 | | | | 1.8 | 25 | Poor | Poor. |
| F | 100 | 0 | 0.25 | 108 | | | | 0.25 | 25 | do | Pass. |
| G | 95 | 0 | 0.25 | 108 | 5 | 0.45 | 0.950 | 0.3 | | do | Fail. |
| H | 90 | 0 | 0.25 | 108 | 10 | 0.45 | 0.950 | 0.26 | 35 | do | Do. |
| I | 75 | 0 | 0.25 | 108 | 25 | 0.45 | 0.950 | 0.21 | | do | Do. |
| J | 74 | 0 | 4.0 | 106 | 26 | 0.45 | 0.950 | 1.5 | 34 | Fair | Do. |
| Parameters defined by the present invention | 90-50 | 2-10 | 0.2-1.0 | 95-110 | 10-50 | .3-2.5 | .93-.96 | .2-1.0 | 16-32 | Good | Pass. |

[1] Concentration of vinyl acetate in the random copolymer in weight percent.
[2] Poor—less than one volt operating range on horizontal sealer giving little or no machine leakers; Fair—approximately one-volt range; Good—more than two-volt range.
[3] Pass—No failures in hand squeeze test, less than 15% failures in ten-foot drop test; Fail—Any failures in hand squeeze test, more than 15% failures in ten-foot drop test.
[4] Film is too limp to track on machine.
[5] Samples E through J contain homopolymer.

We claim:

1. A film having a secant modulus of 16–32K p.s.i., a coefficient of friction of .1 to .3 and a melt index of .2 to 1.0 and improved high temperature strength consisting essentially of a blend of (a) 90 to 50 weight percent of a random copolymer of ethylene and 2 to 10 weight percent of an olefinic unsaturated monomer from the group consisting of vinyl acetate, methyl methacrylate, ethyl acrylate, styrene, vinyl methyl ether, diisobutylene, methacrylic acid, and acrylonitrile wherein said random copolymer is prepared by a high pressure process and has a melt index of about .2 to 1.0 and a melting point of 95–110° C. and (b) 10 to 50 weight percent of a linear copolymer of ethylene and an α-olefin monomer of 3 to 20 carbon atoms said linear copolymer having a density of .93 to .96 and a melt index of .3 to 2.5.

2. The film of claim 1 in which the random copolymer is present in the amount of 70 to 90 weight percent and the linear copolymer is present in the amount of 30 to 10 weight percent.

3. The film of claim 2 in which the random copolymer is ethylene and about 2 to 5 weight percent of vinyl acetate.

4. The film of claim 2 in which the linear copolymer is ethylene copolymerized with butene-1 having a density of about 0.930 to 0.945, a melt index of about 1.9, and present in the amount of about 20 to 30 weight percent of the blend.

5. The film of claim 2 in which the linear copolymer is ethylene copolymerized with octene-1 having a density of 0.94 to 0.96, a melt index of about 0.45, and is present in the amount of about 10–20 weight percent of the blend.

6. The film of claim 1 coated on at least one side with a vinylidene chloride copolymer composition.

7. The film of claim 6 in which the vinylidene chloride copolymer composition is 65–95 parts by weight of vinylidene chloride, 5–35 parts by weight of a copolymerizable ethylenically unsaturated monomer from the group consisting of ethyl acetate, methyl methacrylate, acrylonitrile, acrylic acid or itaconic acid, about 0.1–1.0 weight percent of the copolymer of a nonionic surfactant and 2 to 7 weight percent of the copolymer of a wax having a melting point of at least 75° C. and a hardness value of at least 0.25 kg. per square millimeter at 60° C.

8. The film of claim 6 having at least one side chlorinated and coated with an aqueous copolymer dispersion of about 85–92 weight percent vinylidene chloride, about 4–6 weight percent of an organic acid selected from methacrylic acid and mixtures of methacrylic and acrylic acids containing up to 50 weight percent of acrylic acid and the remainder of the copolymer comprising at least one monomer selected from methyl acrylate, methyl methacrylate, ethyl acrylate and ethyl methacrylate.

9. The film of claim 1 laminated to a film prepared from polymers from the group consisting of polyamides, polyesters, polyolefins, or cellulose.

References Cited

UNITED STATES PATENTS

| | | | |
|---|---|---|---|
| 3,240,766 | 3/1966 | Thomson et al. | 260—80.78 |
| 3,558,330 | 1/1971 | Widiger et al. | 99—174 |
| 3,057,752 | 10/1962 | Covington et al. | 117—138.8 X |
| 3,387,997 | 6/1968 | Sculley | 117—138.8 |
| 2,801,447 | 8/1957 | Wolinski | 117—138.8 X |
| 2,953,541 | 9/1960 | Pecha et al. | 260—897 |
| 3,250,825 | 5/1966 | Martinovich | 260—897 |
| 3,555,110 | 1/1971 | McConnell et al. | 260—876 |

ROBERT F. BURNETT, Primary Examiner

R. A. DAWSON, Assistant Examiner

U.S. Cl. X.R.

99—171 LP; 117—138.8 UA, 161 UH, 168; 161—231, 251, 254, 256; 260—897 A, 897 B